United States Patent [19]

Thornton

[11] Patent Number: 4,486,310

[45] Date of Patent: Dec. 4, 1984

[54] WASTEWATER TRICKLING FILTER AIR RECIRCULATION PROCESS

[76] Inventor: Marvin L. Thornton, 509 SE. Fourth, Ankeny, Iowa 50021

[21] Appl. No.: 623,611

[22] Filed: May 30, 1984

Related U.S. Application Data

[63] Continuation of Ser. No. 472,964, Mar. 7, 1983, abandoned.

[51] Int. Cl.³ .............................................. C02F 3/04
[52] U.S. Cl. .................................. 210/604; 210/612; 210/617
[58] Field of Search ............... 210/603, 604, 612, 613, 210/615, 616, 617, 618, 96.1, 150, 151, 194, 180

[56] References Cited

U.S. PATENT DOCUMENTS

| | | | |
|---|---|---|---|
| 2,308,866 | 1/1943 | Dekema | 210/617 |
| 3,275,147 | 9/1956 | Gilde | 210/150 |
| 3,426,899 | 2/1969 | Smith | 210/96.1 |
| 3,547,811 | 12/1970 | McWhirter | 210/627 |
| 3,872,003 | 3/1975 | Walker | 210/96.1 |
| 3,920,550 | 11/1975 | Farrell | 210/96.1 |
| 3,981,803 | 9/1976 | Coulthard | 210/180 |
| 4,071,443 | 1/1978 | Gorski | 210/627 |
| 4,269,714 | 5/1981 | Ishikawa | 210/627 |
| 4,311,593 | 1/1982 | Benjes | 210/610 |
| 4,356,269 | 10/1982 | Thomsen | 210/180 |

Primary Examiner—Ernest G. Therkorn
Attorney, Agent, or Firm—James D. Birkenholz

[57] ABSTRACT

A wastewater treatment system and process utilizing a trickling filter with a rotary distributor extending thereover for the distribution of wastewater over the filtering medium. A sealed insulating dome overlays the filter to provide a closed environment. An underdrain system extends underneath the filtering medium covering the floor of the filter and includes perforated sections into which the applied wastewater flows. The perforated sections extend into an underdrain gallery which collects the applied wastewater to be recycled by the pump through the distributor or expended out of the filter. Controllable air recirculation system for selectively moving air under the dome through the filtering medium includes a blower in communication with the gallery which directs air through the gallery from under the dome, through discharge conduits and into the filtering medium. The direction of air flow is reversible and the introduction of atmospheric air is provided after passing through a controllable heater. The rate of introduction of atmospheric air is controllable in response to a decreased dissolved oxygen level in the filter effluent and a vent discharges existing air within the system.

1 Claim, 4 Drawing Figures

WASTEWATER TRICKLING FILTER AIR RECIRCULATION PROCESS

This application is a continuation of application Ser. No. 472,964, filed Mar. 7, 1983, now abandoned.

BACKGROUND OF THE INVENTION

1. Field of the Invention

The present invention relates generally to the treatment of wastewater and particularly to a method for the conventional treatment of wastewater during periods of cold air temperature utilizing the controllable recirculation of air through the filter medium.

2. Description of the Prior Art:

The use of trickling filters for treatment of wastewater is well known and practiced in the prior art. Conventional filters typically utilize a rock filtering medium of circular design with a rotary distributor overhead applying wastewater to the surface of the rock. Filters of this design normally are economical in construction and operation and have had wide commercial acceptance. However, in recent years, in response to increased environmental concern, the discharge from wastewater treatment plants is now required to be of a quality that will allow minimum water quality standards as established by state and federal laws to be met in the receiving stream. In order for this to be accomplished, the output from the trickling filter must meet established parameters.

Biological life within the filter medium is the active agent for the treatment of the wastewater, however, its efficiency is temperature dependent. Thus, as the ambient air temperature falls, as occurs in fall and winter, so does the efficiency of the treatment process. This is a very undesirable situation and one which presently is intolerable.

In conventional operation, during cold weather, wastewater is warmer than the atmospheric air above the filtering medium and when distributed over the filtering medium, warms the air in the voids in the medium, creating an upward air flow. Unfortunately, the downward flow of wastewater creats a downward air flow and the end result is a potential stagnation of air flow through the filtering medium. Further, during seasonal climatic changes when the temperature differential between the ambient air and wastewater is small, minimal air flow through the filtering medium occurs. Thus frequently, the filter medium is subjected to minimal ventilation resulting in insufficient oxygen and temperature to sustain the biological life for the metabolism of the pollutants within the wastewater.

SUMMARY OF THE INVENTION

In a wastewater trickling filter treatment system housing a medium with a dome sealingly attached, the controllable recirculation of air through the filtering medium is provided. A filter medium system housing the filtering medium supports a sealed dome. A controllable air recirculation system selectively moves air housed under the dome through the filtering medium. A blower having an intake communicating with the area under the dome directs air through a central gallery which extends through the filtering medium and into discharge conduits which extend underneath the filtering medium. The discharge conduits have spaced apertures through which the forced air passes to flow into the filtering medium. A heater is interposed in line between the intake of the blower and a controllable outside air inlet to warm the outside ambient air when it is introduced into the system. A vent is provided to discharge existing air when ambient air is introduced. Ambient air is introduced into the recirculation system in response to decreased dissolved oxygen levels occurring in the filter effluent. The direction of air flow through the filtering medium is reversible to provide optimum air distribution through the filtering medium.

Upon reversal of air flow, air is pulled from the discharge conduit, through the gallery into the space under the dome and into the surface of the filter medium to reenter the discharge conduit.

In cold weather operation, where typically the filter medium reaches its lowest temperature, air from under the dome is warm and is recirculated. If heat is not added to this air, the direction of air flow may be either direction. If additional heat is added to the recirculated air because of low wastewater temperatures, the recirculated air should enter the filter medium from the top to take advantage of the downward movement of air created by the flow of the wastewater, the graduated cooling of the air as it passes through the filter medium creating a natural convection current downward and the air pressure differential between the top of the filter medium and the bottom created by the force of the blower. The temperature of the filter medium and the wastewater increases, thus providing conditions for improved biological metabolism of the wastewater pollutants.

DESCRIPTION OF THE PREFERRED EMBODIMENT

Figure 1:
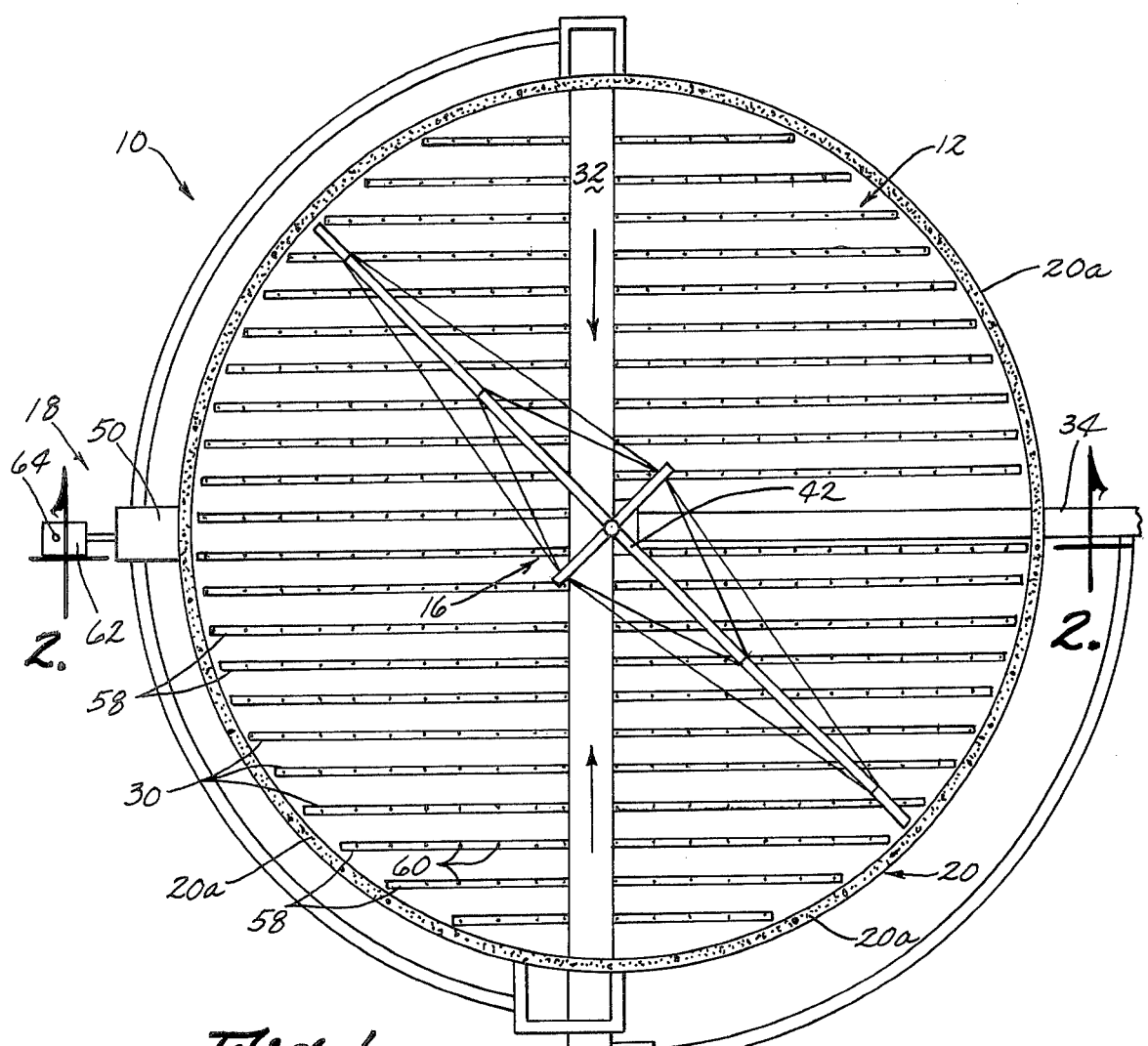
FIG. 1 is a partial top cross-sectional view illustrating the wastewater trickling filter air recirculation system of this invention.

Referring now to the drawings wherein like reference numerials designate identical or corresponding parts throughout the several views, a wastewater trickling filter air recirculation system and process of this invention is shown generally at 10 of FIG. 1.

Figure 2:
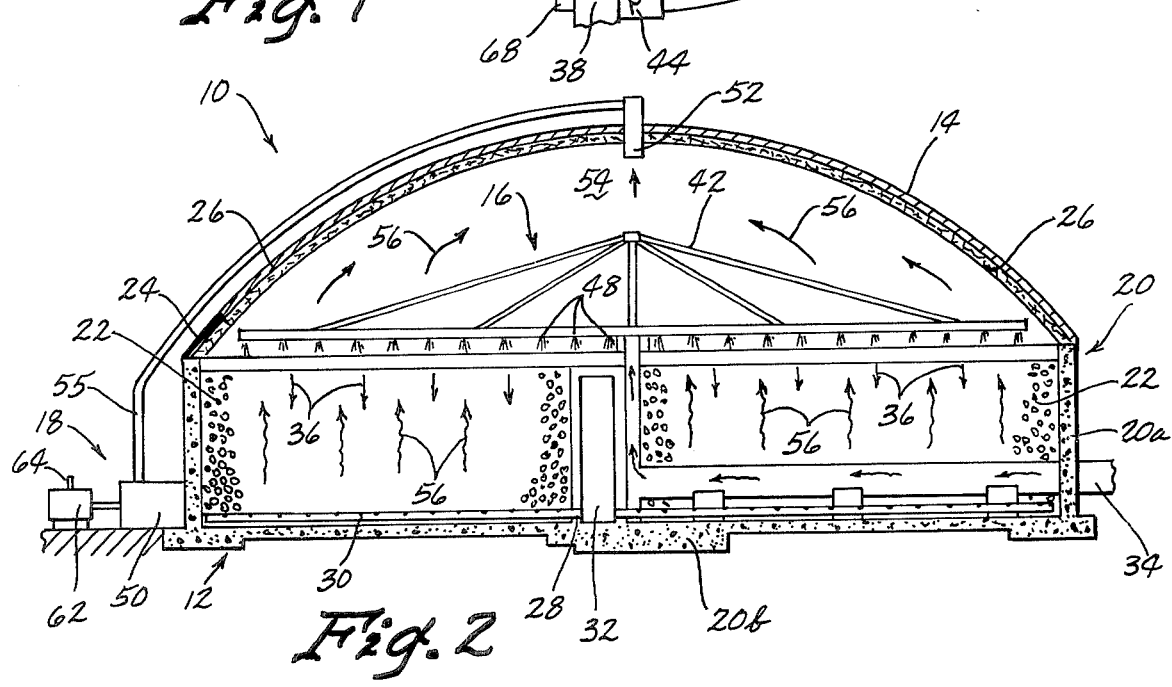
FIG. 2 is a cross-sectional view taken along lines 2—2 of FIG. 1.
Figure 3:
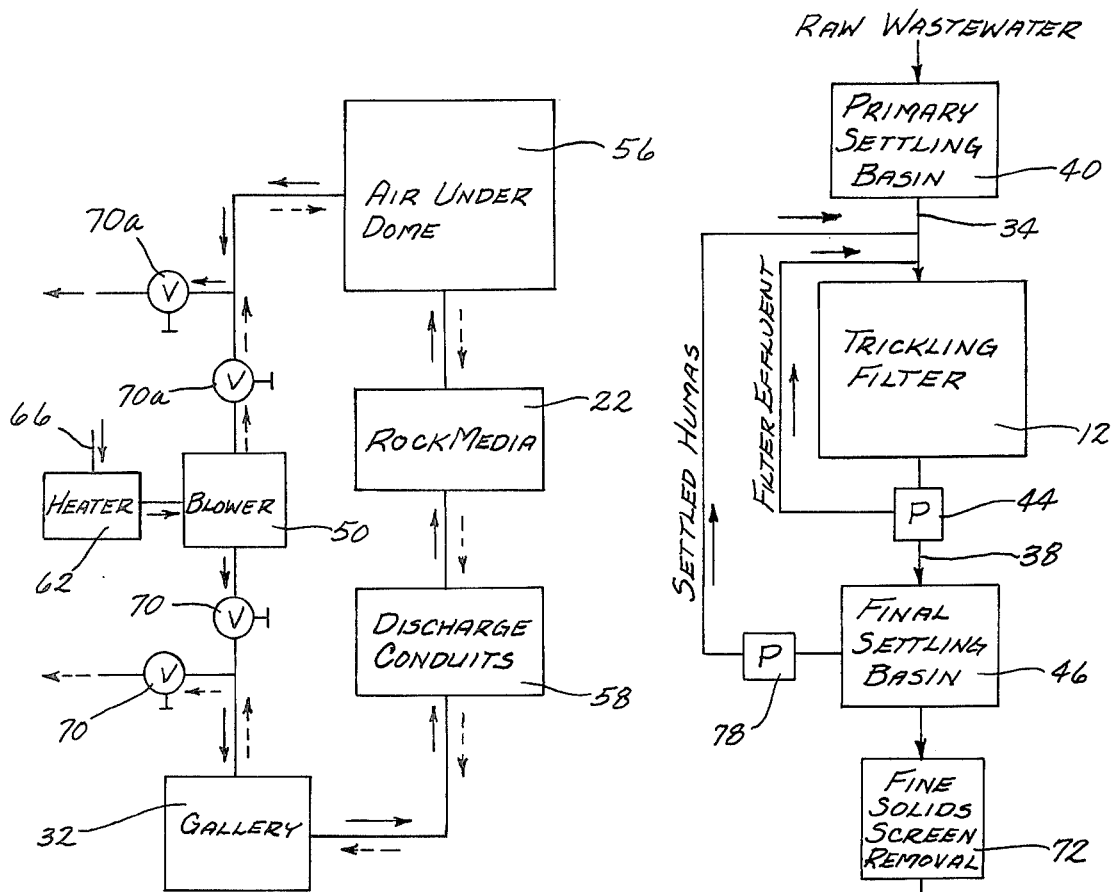
FIG. 3 is a block diagram illustrating the controllable air recirculation system and the air flow pattern through the filter.

Generally, the trickling filter air recirculation system 10 is comprised of filter medium equipment 12 ) FIGS. 1-2), a sealed dome 14, a wastewater dispersal and collection system 16 and a controllable air recirculation system 18 (FIGS. 1-3).

Specifically, the filter medium equipment 12 (FIGS. 1-2) includes a holding tank 20 having generally vertical side walls 20a and a base 20b generally forming a container impervious to water. The specific shape and depth of the holding tank 20 is in part dependent upon specific design requirements, however, generally the holding tank 20 is circular in shape and several feet deep. The tank 20 is filled with a filtering medium 22. The specific filtering medium is in part dependent upon design criteria, however, generally rock or synthetic material is used.

The overlying dome 14 (FIGS. 1 and 2) is generally concentric in shape to provide stability and structural strength and may be constructed of reinforced concrete, light metals or fiberglass material. An entrance and exit hatch 24 is provided for gaining access to the interior of the tank 20. The dome 14 maybe lined with insulating material 26 to reduce heat loss through the dome and is sealingly attached to the side walls 20a of the holding tank 20 to prevent air from escaping.

Figure 4:
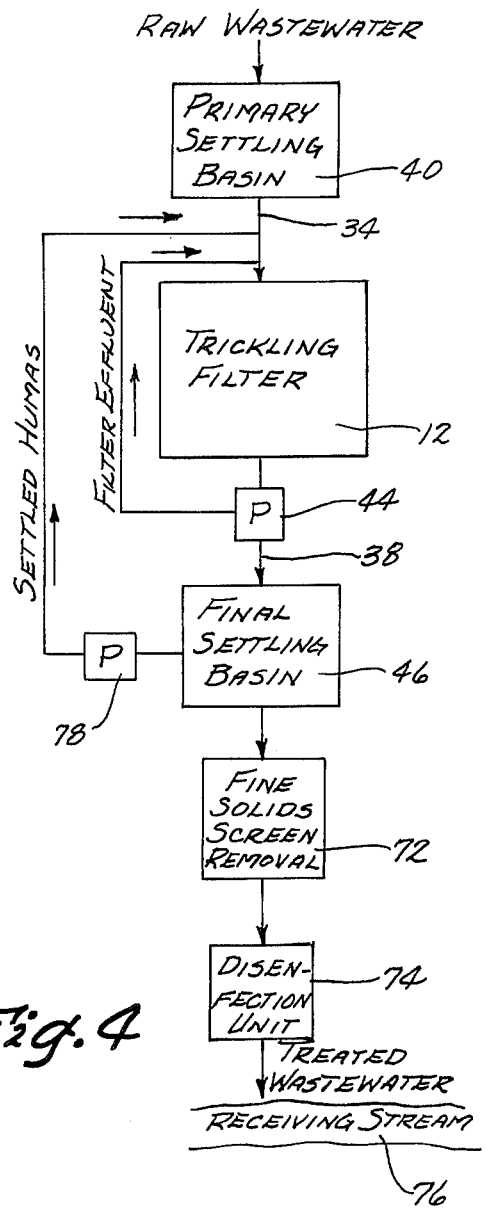
FIG. 4 is a block diagram illustrating a typical wastewater treatment system.

The wastewater dispersal and collection system 16 (FIGS. 1-2) includes an underdrain network 28 of perforated sections 30 located beneath the filtering medium 22 which links up to a central gallery 32 which in turn passes through the filtering medium 22. A feed pipe 34 (FIGS. 1, 2 and 4) supplies wastewater 36 by gravity from a primary settling basin 40 to a distributor arm 42. A pump 44 connects into the central gallery 32 and receives the wastewater 36 after it has passed through the filter medium 22 and returns a controllable amount of wastewater 36 to the feed pipe 34. Wastewater 36 not returned flows by gravity through exit pipe 38 to a final settling basin 46 and finally to a fine solids removal screen 72 and disinfection unit 74 before enteering the stream 76. A pump 78 returns settled humas to feed pipe 34 to pass through the filter 12. During operation of the system 16, the wastewater 36 flows to the distributor arm 42. The arm 42 includes spaced pressure orifices 48 through which the water 36 passes to fall in a shower upon the top surface of the filter medium 22. As the wastewater 36 passes through the orifices 48, the arm 42 is rotated, thus wetting the entire surface of the filter medium 22. The wastewater 36 flows through the filter medium 22 and into the underdrain network 28 through the perforated sections 30 and into the central gallery 32. As illustrated, the sections 30 are channels into which the wastewater 36 flows and is carried to the gallery 32, any structure including structural troughs or channels are adaptable for this purpose, limited only by design operating criteria with respect to the air recirculation system 18. Further, the distributor arm 42 may be replaced by fixed-spaced nozzles providing an even dispersal of wastewater 36 over the surface of the filter medium 22.

A controllable air recirculation system 18 (FIGS. 1-3) includes a reversible blower 50 having an intake 52 communicating with the area 54 under the dome 14 via duct 55. The blower 50 directs air 56 into the gallery 32 under pressure and into the discharge conduits 58 which extend underneath the filtering medium 22. The discharge conduits 58 have spaced apertures 60 through which the air 56 escapes to flow into the filtering medium 22. In most instances, the pipe sections 30 and discharge conduits 58 may be identical. The operating limitation would be the size of the sections 30 and the conduits 58 in order to carry both wastewater 36 and air 56. A heater 62 is connected in line between the blower 50 and a controllable outside air inlet 64. The air inlet 64 permits ambient air 66 outside the system 10 to be controllably introduced into the system 10 after passing through the heater 62. The heater 62 normally will raise the temperature of the air 66 to that of the wastewater 36. A dissolved oxygen level probe 68 measures the dissolved oxygen in the wastewater 36 flowing in pipe 38 and when the dissolved oxygen reaches a predetermined level, the air inlet 64 is adjusted permitting fresh air 66 with higher oxygen content to flow into the system 10 and maintain the predetermined oxygen level within the system 10. Vents 70 and 70a are also opened to release a portion of the low oxygen level air 56 to exit the closed system 10. Air locks are provided on all fluid pipes entering and leaving to maintain the closed system characteristics and prevent escape of air within the system 10.

During operation, the system 10, in late fall, winter and early spring, the temperature of the wastewater 36 will be generally above that of the ambient air 66. When the wastewater 36 is distributed over the filter medium 22, the air contained within the voids of the medium 22 will extract heat from the wastewater 36, thus raising the temperature of the air and to some extent that of the filter medium 22. When the heater 62 is not operating, the direction of air flow through the medium 22 is optional, depending primarily upon which direction provides the most even distribution of air through the medium 22 and whether more heat is needed in the upper or bottom portions of the medium 22. If the air flow is downward through the surface of the medium 22, its movement is aided by the downward flow of wastewater 36 and the gradual cooling of the air 56 as it passes through the medium 22 creating a downward convection current as well as the direct downward force created by the pressure differential resulting from the movement of air 56 through the blower 50. If the heater 62 is operating, the air flow normally will be downward in order to gain full advantage of the natural flow of air 56 as described above. In summer months the air temperature will typically be slightly higher than the wastewater 36 and filter medium 22, wherein a downward flow of air will be the most advantageous.

The continued recirculation of air 56 has a net effect of stabilizing and, depending on climatic conditions, increasing the temperature of the filter medium 22 containing nitrification bacteria.

As the filter medium 22 is maintained at a higher temperature, the metabolism of the wastewater pollutants occurs more readily which results in a higher quality effluent. Further the temperature of the wastewater 36 is generally higher which assists the final settling basin 46 to function more adequately, since cooling of the wastewater 36 which occurs in uncovered systems greatly affects the settling rate. The air recirculation system 18 recirculates and takes advantage of the normal accumulation of warm air 56 that would naturally raise to the upper regions of the dome 14 to assist in maintaining the filter medium 22 in an acceptable temperature range. The other necessary environmental condition, of continuing metabolism of the wastewater pollutants by the biological life besides temperature, is oxygen which is maintained by the controllable introduction of ambient air 66 through the air duct 64. Thus the net result is an operable system which is functionable under all climatic conditions, utilizing the readily available energy to provide a filter medium at acceptable temperature and oxygen levels which adequately sustain the biological life.

Obviously, many modifications and variations of the present invention are possible in light of the above teachings. It is therefore to be understood that, within the scope of the appended claims, the invention may be practiced otherwise than is specifically described.

I claim:

1. A process for the controllable redistribution of air through a trickling filter system in a wastewater treatment facility in order to maintain the filter system in an operable temperature range, the trickling filter system having a holding tank housing a filter medium therein and a dome, said dome attached to and overlaying the tank and defining a given area underneath, means for receiving wastewater into the tank and dispersal thereof over the filter medium and removal thereof from the tank, and a central gallery extending through the filter medium, an air recirculation system including an air blower, the blower communicating with the area under the dome and the central gallery, and discharge conduits, extending underneath the filter medium outwardly from and in communication with the central gallery having spaced apertures through which air may pass, the process comprising:

the recirculation of air thru the filter medium in response to the temperature of the filter medium in order to maintain the filter medium in a functionable temperature range.

* * * * *